United States Patent
Freudelsperger et al.

(10) Patent No.: US 6,907,983 B2
(45) Date of Patent: Jun. 21, 2005

(54) CONVEYING DEVICE FOR CONVEYING STOCK ON PALLETS OR THE LIKE WITH CHANGE OF DIRECTION

(75) Inventors: Karl Freudelsperger, Hart bei Graz (AT); Wilfried Waukmann, Raaba (AT)

(73) Assignee: Knapp Logistic Automation GmbH, Hart bei Graz (AT)

( * ) Notice: Subject to any disclaimer, the term of this patent is extended or adjusted under 35 U.S.C. 154(b) by 0 days.

(21) Appl. No.: 10/494,353

(22) PCT Filed: Nov. 13, 2002

(86) PCT No.: PCT/EP02/12651
§ 371 (c)(1),
(2), (4) Date: Apr. 29, 2004

(87) PCT Pub. No.: WO03/043915
PCT Pub. Date: May 30, 2003

(65) Prior Publication Data
US 2004/0251112 A1 Dec. 16, 2004

(30) Foreign Application Priority Data
Nov. 22, 2001 (DE) .......................................... 101 57 161

(51) Int. Cl.[7] .............................................. B65G 47/80
(52) U.S. Cl. .............................. 198/468.01; 198/463.3; 198/574; 198/587
(58) Field of Search ........................ 198/468.01, 574, 198/587, 463.3, 457.02, 457.03

(56) References Cited
U.S. PATENT DOCUMENTS 2,729,324 A * 1/1956 Howdle
3,184,030 A * 5/1965 Ludwig
3,522,942 A * 8/1970 Hepp
3,595,365 A * 7/1971 Faure
3,595,367 A * 7/1971 Faure
4,014,428 A * 3/1977 Ossbahr
4,172,512 A * 10/1979 Clegg et al.
4,349,097 A * 9/1982 Curti
4,478,329 A * 10/1984 Heiz
4,599,025 A * 7/1986 Borsuk et al.
4,679,977 A * 7/1987 Minami
4,759,434 A * 7/1988 Dorner
4,805,758 A * 2/1989 Dominico et al.
4,889,463 A * 12/1989 Frost et al. ............. 414/416.01
5,090,554 A * 2/1992 De Sanctis ................. 198/414
6,308,818 B1   10/2001 Bonora et al.
6,591,961 B2 * 7/2003 Fukushima ............... 198/346.2

FOREIGN PATENT DOCUMENTS

| DE | 1 259 241 | 1/1968 | |
|---|---|---|---|
| DE | 199 34 361 | 1/2001 | |
| DE | 201 19 005 | 4/2002 | |
| DE | 101 39 272 A1 * | 3/2003 | ........... B65G/47/52 |

* cited by examiner

Primary Examiner—Douglas Hess
(74) Attorney, Agent, or Firm—McGlew and Tuttle, P.C.

(57) ABSTRACT

A conveying device (1) with change of direction for conveying stock, preferably on pallets (2), along a first conveying line (3) and along a second conveying line (4) oriented in a different direction, and with a transferring system for transferring the pallets from the first to the second conveying line. The transferring system is provided in the form of a driven linear conveying track (5) for receiving the pallet(s) (2) from the first conveying line (3), for linearly advancing it/them on the linear conveying track and for transferring the pallet(s) to the second conveying line (4). The linear conveying track can swivel around an essentially vertical axis (7) between the first and the second conveying line via a driven swivel device (6). The vertical axis is located outside of the conveying track center (m) of the linear conveying track (5).

20 Claims, 6 Drawing Sheets

CONVEYING DEVICE FOR CONVEYING STOCK ON PALLETS OR THE LIKE WITH CHANGE OF DIRECTION

FIELD OF THE INVENTION

The present invention pertains to a conveying means with change of direction for conveying material to be conveyed preferably on pallets or the like along a first conveying track and a differently directed, second conveying track, as well as a transfer arrangement for transferring the pallets from the first conveying track to the second conveying track.

The term "pallet" as used above and below shall not be understood in the restricted meaning; the present invention rather also comprises systems in which other transport units, for example, skeleton containers, are used in order to transport material to be conveyed, especially individual products, in or on them. If the material to be conveyed is a larger individual product with a comparatively large floor space, pallets or the like per se may be abandoned altogether in which case the product or material itself is the "pallet" as used herein.

BACKGROUND OF THE INVENTION

The principal problem in designing a conveying means with change of direction especially for heavy individual products on pallets, skeleton containers, etc., is that no sliding should possibly occur when the pallet moves into the curve. The change of direction takes place for this reason in prior-art transfer arrangements by transfer between longitudinal and cross conveyors or by rotary tables, which take up the material to be conveyed including the pallet centrally when the material to be conveyed has stopped and then pivot them slowly around the center of the pallet over a central vertical axis of the rotary table into the direction of release of the second conveying track in order to release the material to be conveyed there. The transfer operation takes place similarly to a turning platform of an engine at a freight station. The drawback of a prior-art rotary table is the complicated design and the low throughput of the pallets, which are stopped during the slow pivoting of the turning platform.

SUMMARY OF THE INVENTION

The basic object of the present invention is to provide a conveying means of the type described in the introduction, whose transfer arrangement makes possible a high pallet throughput of even heavy materials to be conveyed in an energy-saving manner and with simple means.

According to the invention, a conveying means is provided with change of direction for conveying material to be conveyed, preferably on pallets or the like, along a first conveying track and a second, differently directed conveying track. A transfer arrangement is provided for transferring the pallets from the first conveying track to the second conveying track, wherein the transfer arrangement comprises a driven linear conveyor track for taking over the pallet(s) from the first conveying track, for linear forward movement on the linear conveyor track and for releasing the pallet(s) onto the second conveying track. The linear conveyor track is pivotable between the first and second conveying tracks by means of a driven pivoting means around an essentially vertical axis, which extends outside the middle of the linear conveyor track. The linear drive of the linear conveyor track and the pivoting drive of the pivoting means are actuated by means of a common control means such that said pallets are transferred and moved continuously in the transfer arrangement. The linear drive of the linear conveyor track and the pivoting drive of the pivoting means are actuated by the control means such that the linear conveying movement of the linear conveyor track is braked or decelerated during the take-over of the pallet(s) from the first conveying track in a certain initial section, especially up to the middle of the pivoting movement and the pivoting movement of the linear conveyor track is at the same time accelerated from the stop, while the linear conveying movement of the linear conveyor track is subsequently accelerated, especially from the middle of the pivoting movement or in a certain end section until the release of the pallets onto the second conveying track and the pivoting movement of the linear conveyor track is decelerated at the same time to a stop.

An essential aspect of the present invention is that the transfer arrangement comprises a driven linear conveyor track for taking over the pallet(s) from the first conveying track, linear forward movement on the linear conveyor track and releasing the pallet(s) onto the second conveying track, wherein the linear conveyor track is pivotable between the first and second conveying tracks by means of a driven pivoting means around an essentially vertical axis, which extends outside the center of the linear conveyor track. After the pallet(s) has (have) been released, the linear conveyor track can be reset into its initial position on the pivoting and linear path.

The linear drives of the linear conveyor track and the pivoting drives of the pivoting means are preferably actuated by means of a common control means such that pallets are transferred or moved continuously in the transfer arrangement, and the linear drive of the linear conveyor track and the pivoting drive of the pivoting means are especially preferably actuated by the control means such that when the pallets are taken over from the first conveying track, the linear conveying movement of the linear conveyor track is braked or decelerated in a certain initial section, especially up to the middle of the pivoting movement, and the pivoting movement of the linear conveyor track is at the same time accelerated from the stopped state, and the linear conveying movement of the linear conveyor track is subsequently accelerated especially from the middle of the pivoting movement or in a certain end section until the release of the pallets onto the second conveying track, and the pivoting movement of the linear conveyor track is decelerated at the same time until stopping.

In a special embodiment, the linear conveyor track comprises a table with a top-side, driven linear conveying means, which table is pivotable around the vertical axis, wherein the axis is located outside the center of the table radially inside, preferably within the angle between the first conveying track and the second conveying track.

The term "table" as used above and below shall not be understood in the restricted meaning; the present invention rather also comprises systems in which other pick-up units, for example, subframes, are used in order to transfer material to be conveyed, especially individual products, on them.

The transfer arrangement comprises a table, which is equipped with a driven materials handling technology, preferably driven conveying chains for the cross conveying of pallets, or driven rollers for the longitudinal conveying of pallets. The table itself is pivotable around a vertical axis, whose fulcrum is located according to the present invention outside the table. The force of gravity is preferably removed by means of rollers, which run on circular arc-shaped rails.

The advantage of the conveying means according to the present invention over a conventional rotary table is the simpler design with the advantages associated therewith in terms of manufacture and price, as well as the higher throughput of even heavy materials, preferably by a continuous pallet transport, because the pallet is deposited radially outside on the turning platform when a pallet enters the "eccentric turning platform" due to the eccentric arrangement of the vertical pivot axis in relation to the linear conveyor track, and the "momentum" or the kinetic energy of the moving pallet can be utilized as a result during the transfer operation. In particular, the pallet is decelerated during the input on the linear conveyor track, and an accelerated pivoting movement is initiated at the same time. This may happen up to the middle of the pivoting movement of the eccentric rotary table. Conversely, the pivoting movement of the eccentric rotary table is again braked or decelerated after the middle or on the output side, and the linear forward movement of the linear conveyor track is again accelerated until the initial position in relation to the second conveying track is reached, where the pallet is released speedily in an aligned position. The individual drives are correspondingly coordinated with one another.

Thus, at least part of the kinetic energy is transmitted in the present invention on the input side of the transfer arrangement from the translatory movement to the rotatory movement, and, conversely, the rotatory movement is again returned into translatory movement on the output side. The pallet leaves the transfer arrangement without coming to a stop. As soon as the pallet has been completely transferred to the second conveying track, the transfer arrangement pivots back into its initial position.

Consequently, the energy expended for a linear drive of the linear conveyor track and for a pivoting drive of the pivoting means is small.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Referring to the drawings in particular, FIGS. 1 through 6 show a conveying means 1 with change of direction for conveying material to be conveyed on pallets 2 or the like along a first linear conveying track 3 and a second linear conveying track 4 arranged at right angles thereto at the same level, as well as with a transfer arrangement for transferring the pallets 2 from the first conveying track to the second conveying track.

The transfer arrangement comprises a linear conveyor track 5, which is driven by a linear drive 8 and can be pivoted around a vertical axis 7 between the first conveying track 3 and the second conveying track 4 by means of a pivoting means 6 driven by a pivoting drive 9.

The vertical axis 7 is located outside the middle m of the linear conveyor track 5.

In particular, the linear conveyor track comprises a table 10 with linear conveying means in the form of two lateral, parallel, circulating conveying chains 14, which are driven by the linear drive 8. The carrying runs of the two conveying chains 14 slightly project over the plane of the table and are located exactly at the level of the conveying means of the first and second conveying tracks 3 and 4, which likewise have circulating, driven conveying chains.

The table 10 in the exemplary embodiment being shown in the drawing is not shown as a platform, but as a frame. It shall be understood to be a horizontal support, which has the aforementioned chain type conveying means.

The table 10 has a lateral, horizontal pivot arm 13, which is firmly connected with the table 10 and is articulated to the vertical axis 7.

The vertical axis 7 is located outside the center of the table at an angle α between the first and second conveying tracks 3 and 4, approximately at the intersection of the extensions of the two inner conveying chains of the first and second conveying tracks 3 and 4 in the exemplary embodiment being shown.

The table 10, which is rectangular in its top view, has idling rollers 11 on its underside, at its four corner points, which rollers are guided on a stationary rolling support in the form of two concentric, circular arc-shaped rails 12. Both circular arc segments have the vertical axis 7 as their center.

The stationary pivoting drive 9, which drives the pivot arm 13 of the pivoting means 6 by means of a gear mechanism, not shown, in order to pivot the table 10 in the horizontal plane by an angle of 90° from the first conveying track 3 to the second conveying track 3 and to again reset it, is located at the angle α between the first under the second conveying track 3 and 4.

Instead of the stationary pivoting drive 6, the rollers 11 may also be driven rollers, whose drive is now arranged at the pivotable table.

The driven rollers may also be replaced with a toothed rack drive, in which case the rollers are replaced with drive pinions, which engage circular arc-shaped, bottom-side toothed racks, which replace the aforementioned circular arc-shaped rails 12.

Figure 1:
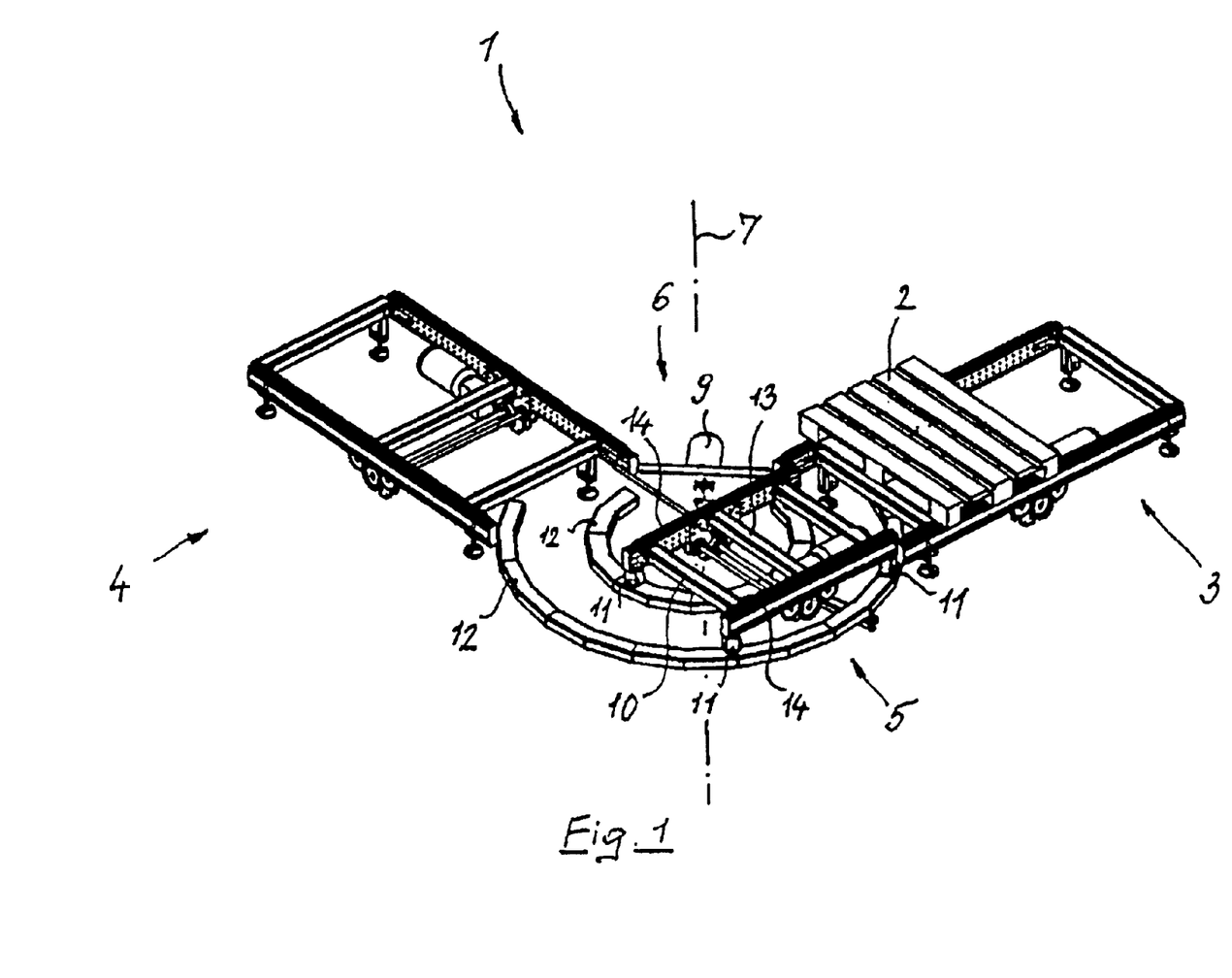
FIG. 1 is a schematic perspective view of a conveying means for conveying material to be conveyed on pallets with a transfer arrangement according to the present invention between a first linear conveying track and a second linear conveying track at the same level, which extend at an angle in relation to one another.
Figure 2:
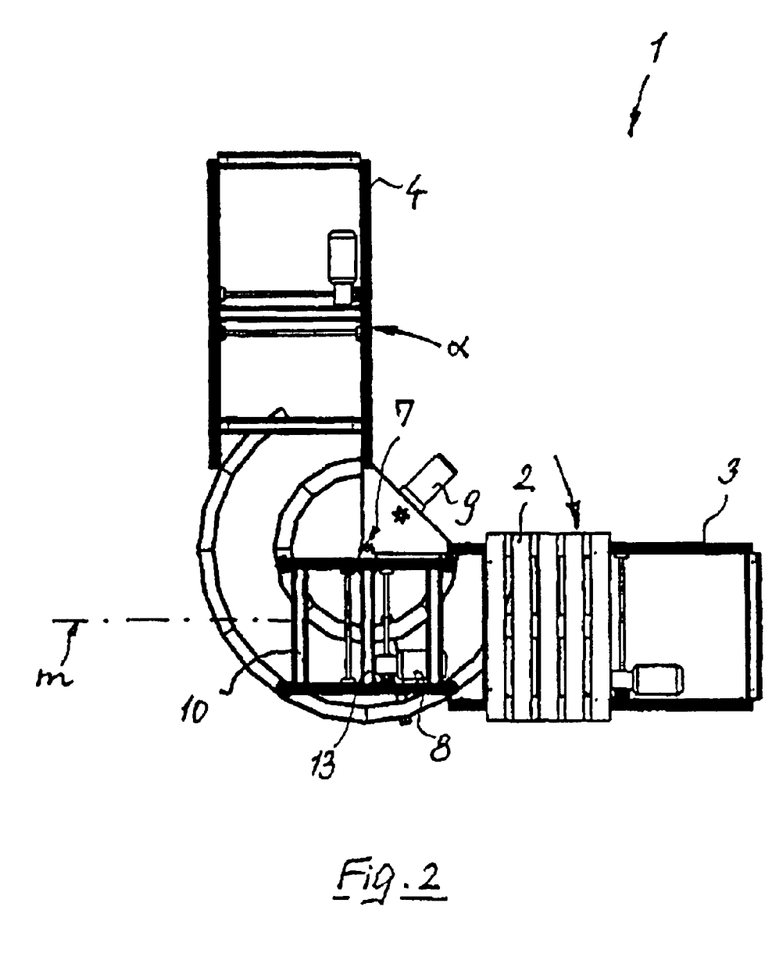
FIG. 2 is a schematic top view of the conveying means according to FIG. 1 with a pallet at the output of the first conveying track.
Figure 3:
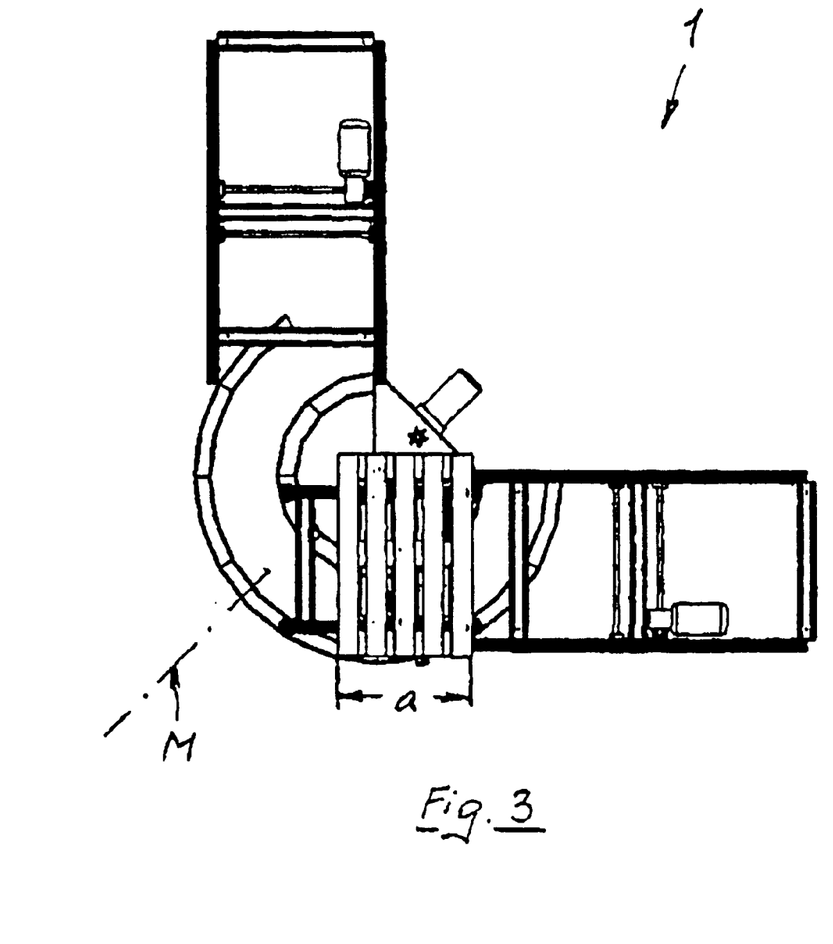
FIG. 3 is a schematic top view of the conveying means with a pallet immediately after the transfer to the transfer arrangement.
Figure 4:
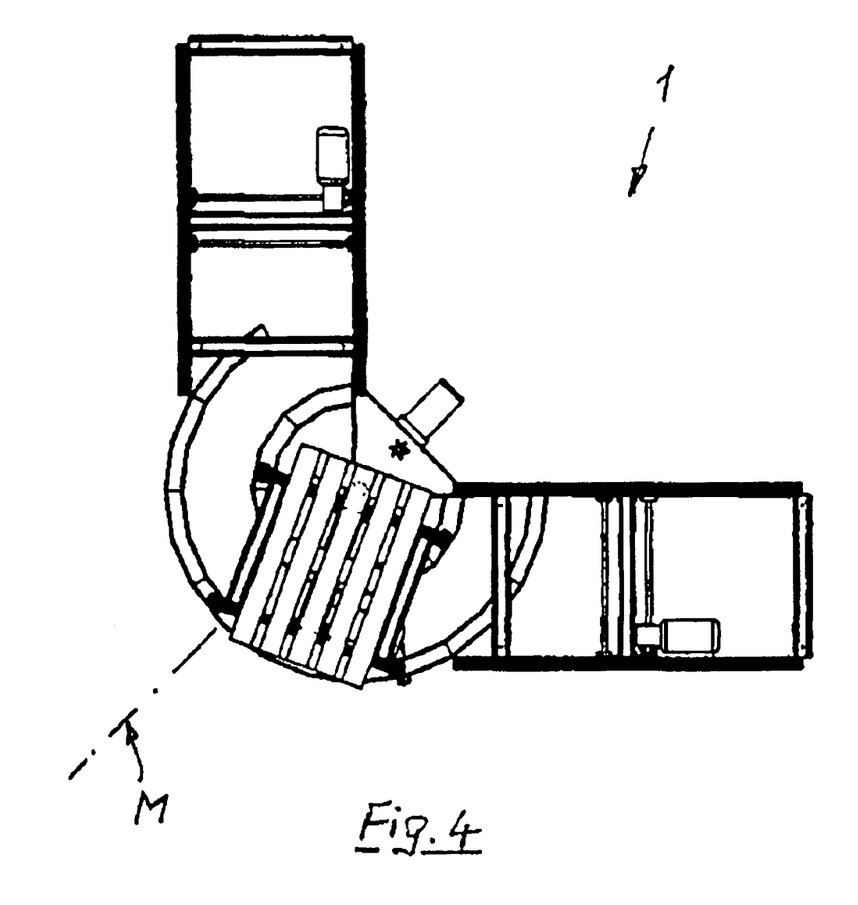
FIG. 4 is a schematic top view of the conveying means with a pallet on the transfer arrangement in a first pivoted position, still before the middle of the pivoting movement.
Figure 6:
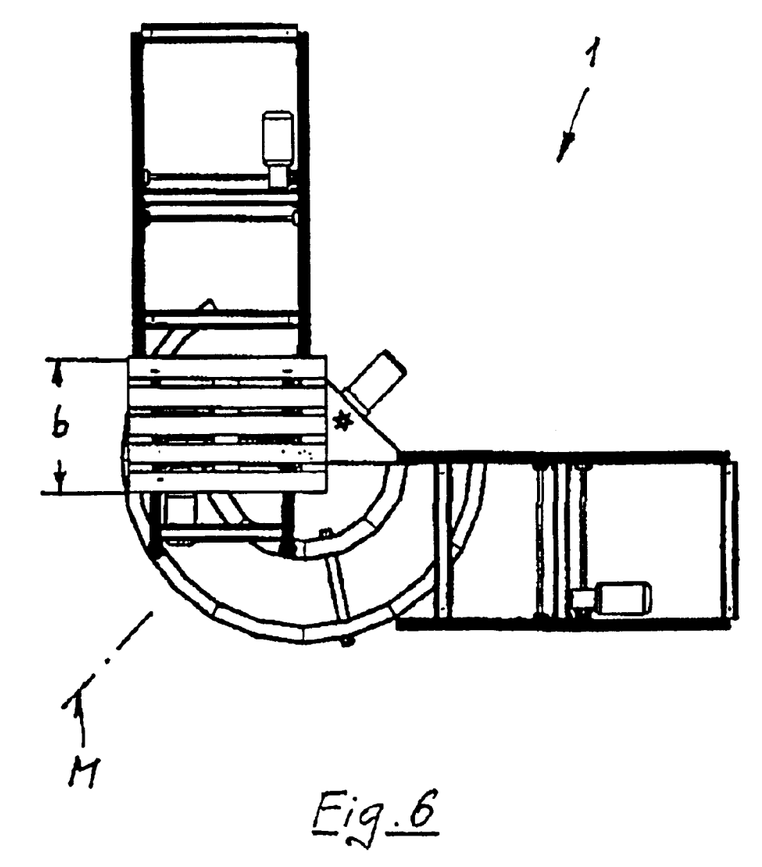
FIG. 6 is a schematic top view of the conveying means with a pallet on the transfer arrangement immediately before the release onto the second conveying track.

The linear conveyor track 5 with its lateral conveying chains 14 makes possible the linear forward movement of the pallets 2 in order to move the pallets 2 linearly forward from the position according to FIG. 3 into the position according to FIG. 6, regardless of the pivoting movement here.

The linear drives 8 of the linear conveyor track 5 and the pivoting drives 9 of the pivoting means 6 are activated by means of a common control means (not shown), which also actuates the linear drives of the first and second conveying tracks.

The aforementioned actuations cause the pallets 2 in the conveying means 1 to be transferred and moved continuously.

During the take-over of the pallet 2, the linear conveying movement of the linear conveyor track being driven at the circumferential velocity of the first conveying track is braked or decelerated, in particular, to a minimum, optionally to a stop, immediately after the transfer of the pallet 2 from the first conveying track 3 according to FIG. 3 in a certain initial section a, and the pivoting movement of the linear conveyor track is accelerated at the same time from stop to a maximum.

The linear conveyor track and the pivoting means are subsequently operated at a continuous linear or rotation velocity in an intermediate section.

Figure 5:
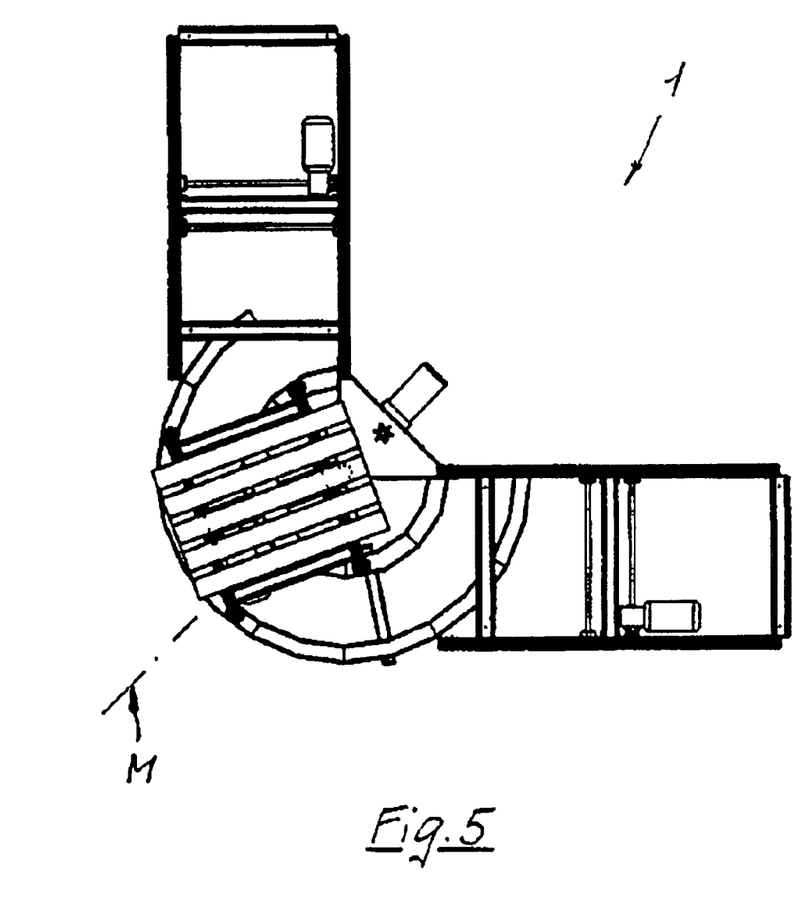
FIG. 5 is a schematic top view of the conveying means with a pallet on the transfer arrangement in a second pivoted position shortly after the middle of the pivoting movement.

Shortly after the middle M of the pivoting movement according to FIG. 5, the linear conveying movement of the linear conveyor track 5 is accelerated in a certain end section b until the pallet 2 is released onto the second conveying track 4, and the pivoting movement of the linear conveyor track is decelerated at the same time to a stop. The acceleration of the linear conveyor track 5 takes place until the circumferential velocity of the second conveying track 4 is reached in order to transfer the pallet 2 subsequently thereto to the second conveying track without jerks.

Once the pallet 2 has been transferred to the second conveying track 4, the transfer arrangement is reset into its initial position according to FIG. 3 on the same pivoting and linear path.

The aforementioned accelerations and decelerations may take place exactly up to the middle M of the pivoting movement. Continuous driving of the pivoting means and of the linear conveyor track in the above-mentioned intermediate section is eliminated in this case.

Contrary to a conventional rotary table with central pivot axis, the present invention is characterized by the eccentrically inner arrangement of the vertical pivot axis at an angle between the first and second conveying tracks. As a result, the kinetic energy ("momentum") of the pallet 2 introduced onto the transfer arrangement can be utilized for a drive for initiating the pivoting movement. Conversely, the rotation energy can again be converted into translatory energy after the middle of the pivoting movement. As a result, this means a high throughput of pallets in the transfer arrangement at a low energy consumption, which is highly advantageous precisely in the case of heavy materials to be conveyed.

While a specific embodiment of the invention has been shown and described in detail to illustrate the application of the principles of the invention, it will be understood that the invention may be embodied otherwise without departing from such principles.

What is claimed is:

1. A conveying device for conveying material or product with a change of direction, the conveying device comprising:
    a first conveying track;
    a second differently directed conveying track;
    a transfer arrangement for transferring the material or product from said first conveying track to said second conveying track, said transfer arrangement comprising a driven pivoting means with a pivoting drive and a driven linear conveyor track with a linear drive for taking over the material or product from said first conveying track and for linear forward movement on said linear conveyor track and for releasing the material or product onto said second conveying track, said linear conveyor track being pivotable between said first and second conveying tracks by means of said driven pivoting means around an essentially vertical axis extending outside a middle of said linear conveyor track;
    a common control means for actuating said linear drive of said linear conveyor track and said pivoting drive of said pivoting means such that the material or product are transferred and moved continuously in said transfer arrangement, wherein said linear drive of said linear conveyor track and said pivoting drive of said pivoting means are actuated by said control means such that the linear conveying movement of said linear conveyor track is braked or decelerated during the take-over of the material or product from said first conveying track in a certain initial section up to the middle of the pivoting movement and the pivoting movement of said linear conveyor track is at the same time accelerated from the stop, while the linear conveying movement of said linear conveyor track is subsequently accelerated from the middle of the pivoting movement or in a certain end section until the release of the material or product onto said second conveying track and the pivoting movement of said linear conveyor track is decelerated the same time to a stop.

2. A conveying device in accordance with claim 1, wherein said linear conveyor track has a table with a top-side having a driven linear conveying means, said table being pivotable around said vertical axis, wherein said vertical axis is located outside the center of said table radially inside at an angle between said first and second conveying tracks.

3. A conveying device in accordance with claim 2, wherein on an underside, said table has rolling means with rollers supported and guided on a stationary, sliding or rolling support, on circular or arc-shaped rails.

4. A conveying device in accordance with claim 2, wherein said table has at least one fixed lateral pivot arm pivotingly connected to said vertical axis.

5. A conveying device in accordance with claim 4, wherein said pivot arm is driven by a stationary pivoting drive.

6. A conveying device in accordance with claim 2, wherein said pivoting drive is formed by driven rollers arranged on an underside of the table or is an arc-shaped toothed rack drive.

7. A conveying device in accordance with claim 2, wherein said linear conveying means includes two parallel driven and circulating conveying chains located at spaced locations from one another and project from a plane of the table on the top side.

8. A conveying device in accordance with claim 2, wherein said linear conveying means are driven individual rollers, which extend in the transverse direction of said linear conveyor track.

9. A conveying device in accordance with claim 2, wherein said linear conveying means includes a driven circulating conveyor belt.

10. A conveying device in accordance with claim 2, wherein said linear conveyor track and said first and second conveying tracks have said linear conveying means of the same kind.

11. A conveying device in accordance with claim 1, wherein after the release of the material or product onto said second conveying track, said linear conveyor track can be reset initial position on the same pivoting and linear path.

12. A method of conveying a material, product or a pallet or support with one or more materials or products thereon, the method comprising:

providing a first conveying track;

providing second differently directed conveying track;

transferring the material, product, pallet or support from the first conveying track to the second conveying track with a transfer arrangement having a driven pivoting means with a pivoting drive and a driven linear conveyor track with a linear drive for taking over the material or product from the first conveying track and for linear forward movement on the linear conveyor track and for releasing the material or product onto the second conveying track, the linear conveyor track being pivotable between the first and second conveying tracks by means of the driven pivoting means around an essentially vertical axis extending outside a middle of the linear conveyor track;

actuating the linear drive of the linear conveyor track and the pivoting drive of the pivoting means such that the material or product are transferred and moved continuously in the transfer arrangement, wherein the linear drive of the linear conveyor track and the pivoting drive of the pivoting means are actuated such that the linear conveying movement of the linear conveyor track is braked or decelerated during the take-over of the material or product from the first conveying track in a certain initial section up to the middle of the pivoting movement and the pivoting movement of the linear conveyor track is at the same time accelerated from the stop, while the linear conveying movement of the linear conveyor track is subsequently accelerated from the middle of the pivoting movement or in a certain end section until the release of the material or product onto the second conveying track and the pivoting movement of the linear conveyor track is decelerated at the same time to a stop.

13. A conveying device in accordance with claim 12, wherein the linear conveyor track has a table with a top-side having a driven linear conveying means, the table being pivotable around the vertical axis, wherein the vertical axis is located outside the center of the table radially side at an angle between the first and second conveying tracks.

14. A conveying device in accordance with claim 13, wherein on an underside, the table has rollers supported and guided on a stationary, sliding or rolling support, on circular or arc-shaped rails.

15. A conveying device in accordance with claim 13, wherein the table has at least one fixed lateral pivot arm pivotingly connected to the vertical axis.

16. A conveying device in accordance with claim 15, wherein the pivot arm is driven by a stationary pivoting drive.

17. A conveying device in accordance with claim 13, wherein the pivoting drive is formed by driven rollers arranged on an underside of the table or is an arc-shaped toothed rack drive.

18. A conveying device in accordance with claim 13, wherein the linear conveying means includes two parallel driven and circulating conveying chains located at spaced locations from one another and project from a plane of the table on the top side.

19. A conveying device in accordance with claim 13, wherein the linear conveying means are driven individual rollers, which extend in the transverse direction of the linear conveyor track.

20. A conveying device in accordance with claim 13, wherein the linear conveying means includes a driven circulating conveyor belt.

* * * * *